UNITED STATES PATENT OFFICE.

AMOR SMITH, OF BALTIMORE, MARYLAND.

IMPROVED FERTILIZER.

Specification forming part of Letters Patent No. 88,223, dated March 23, 1869.

*To all whom it may concern:*

Be it known that I, AMOR SMITH, of Baltimore, in the county of Baltimore and State of Maryland, have invented a new and useful Improvement in Fertilizers; and I do hereby declare that the following is a full, clear, and exact description of the same.

My invention consists in a new mode of preparing refuse leather for use as a fertilizer, and in producing a new article of manufacture, by mixing such product with a phosphate.

It is known that ammonia forms a large ingredient in the chemical constitution of leather, and the use of leather as a fertilizer is not new; but if the leather is used in its raw state it will require a long time under exposure to bring it into a state of decomposition, so as to yield its ammonia.

It is also known that by first subjecting the leather to the action of sulphuric acid it may afterward, by boiling, be brought into a condition in which it may be ground in a mill, and so employed as a fertilizer.

I do not therefore claim the use of leather for this purpose, nor do I claim, broadly, a mode of preparation which includes the use of chemical agents for decomposing the leather; but I have discovered that by first subjecting the leather to the action of steam, at a pressure of about seventy-five pounds to the square inch, in a close chamber, for a period of from four to eight hours, according to the quality and condition of the leather, it is brought into a condition in which it may be ground after being dried. I therefore prepare the fertilizer in the following manner:

I use refuse leather, new or old, and, without cutting it into small pieces, place it in a chamber, and subject it to the action of steam, at a pressure of about seventy-five pounds to the square inch, for from four to eight hours. The latter period will be generally sufficient even to reduce the soles and heels of old boots and shoes. After being dried, either with or without pressure, the leather is ground, in any convenient manner, into a coarse powder, and is then ready for use.

It will rarely occur, however, that this fertilizer will be desired for use alone. To provide a fertilizer containing all the chemical constituents usually required, I mix it, in the proportion of one to four or five, with any of the phosphates in common use, such as the Nevassa phosphate, or the Ashley phosphate, found in South Carolina, thus producing a cheaper fertilizer than any heretofore known, containing the same valuable ingredients in the proportion required for use.

What I claim as my invention, and desire to secure by Letters Patent, is—

1. The mode of preparing leather for use as a fertilizer, by simply steaming, drying, and pulverizing it, without the necessity for the employment of chemical agents, substantially as set forth.

2. As a new article of manufacture, a fertilizer composed of a phosphate and leather which has been steamed, dried, and pulverized, substantially as set forth.

In testimony whereof I have signed my name to this specification in the presence of two subscribing witnesses.

AMOR SMITH.

Witnesses:
R. MASON,
D. P. HOLLOWAY.